United States Patent
Kim et al.

(10) Patent No.: US 9,921,710 B2
(45) Date of Patent: Mar. 20, 2018

(54) METHOD AND APPARATUS FOR CONVERTING AND DISPLAYING EXECUTION SCREENS OF A PLURALITY OF APPLICATIONS EXECUTED IN DEVICE

(71) Applicant: Samsung Electronics Co. Ltd., Suwon-si, Gyeonggi-do (KR)

(72) Inventors: Eun-young Kim, Yongin-si (KR); Kang-tae Kim, Yongin-si (KR); Keun-jik Kim, Suwon-si (KR); Duck-hyun Kim, Suwon-si (KR); Chul-joo Kim, Suwon-si (KR); Kwang-won Sun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/801,101

(22) Filed: Mar. 13, 2013

(65) Prior Publication Data

US 2013/0311937 A1 Nov. 21, 2013

(30) Foreign Application Priority Data

May 21, 2012 (KR) ........................ 10-2012-0053777

(51) Int. Cl.
*G06F 3/048* (2013.01)
*G06F 3/0481* (2013.01)
*G06F 3/0488* (2013.01)
*G06F 3/0482* (2013.01)

(52) U.S. Cl.
CPC .......... *G06F 3/0481* (2013.01); *G06F 3/0482* (2013.01); *G06F 3/0488* (2013.01); *G06F 3/04817* (2013.01); *G06F 2203/04804* (2013.01)

(58) Field of Classification Search
CPC ......... G06F 3/0485; G06F 2203/04808; G06F 3/04842; G06F 9/4443
See application file for complete search history.

(56) References Cited

U.S. PATENT DOCUMENTS

| | | | |
|---|---|---|---|
| 6,686,852 | B1 | 2/2004 | Guo |
| 2003/0076347 | A1* | 4/2003 | Barrett ................. H04N 7/163 715/719 |
| 2003/0076362 | A1 | 4/2003 | Terada |
| 2004/0056903 | A1 | 3/2004 | Sakai |
| 2005/0235220 | A1 | 10/2005 | Duperrouzel et al. |

(Continued)

FOREIGN PATENT DOCUMENTS

| | | |
|---|---|---|
| CN | 1344989 A | 4/2002 |
| CN | 1458576 A | 11/2003 |

(Continued)

*Primary Examiner* — William Bashore
*Assistant Examiner* — Rayeez Chowdhury
(74) *Attorney, Agent, or Firm* — Jefferson IP Law, LLP

(57) ABSTRACT

A method and an apparatus for converting and displaying execution screens of a plurality of applications included a device in which the plurality of applications are provided. The method includes displaying an execution screen of a first application from among the plurality of applications, receiving an external input corresponding to the first application, generating a list of the plurality of applications according to the external input, selecting a second application from among the plurality of applications by using the list, and displaying an execution screen of the second application.

16 Claims, 7 Drawing Sheets

(56) References Cited

U.S. PATENT DOCUMENTS

| | | | |
|---|---|---|---|
| 2007/0192726 A1 | 8/2007 | Kim et al. | |
| 2008/0141167 A1* | 6/2008 | Kubo | G06F 3/0482 715/796 |
| 2008/0172609 A1* | 7/2008 | Rytivaara | G06F 9/45512 715/700 |
| 2008/0188267 A1* | 8/2008 | Sagong | G06F 1/1626 455/566 |
| 2008/0214239 A1 | 9/2008 | Hashimoto et al. | |
| 2008/0320396 A1 | 12/2008 | Mizrachi et al. | |
| 2009/0193351 A1* | 7/2009 | Lee | G06F 3/0482 715/769 |
| 2009/0307631 A1 | 12/2009 | Kim et al. | |
| 2009/0315848 A1* | 12/2009 | Ku | G06F 3/0416 345/173 |
| 2009/0322690 A1 | 12/2009 | Hiltunen et al. | |
| 2010/0062811 A1 | 3/2010 | Park et al. | |
| 2010/0064255 A1* | 3/2010 | Rottler | G06F 3/0488 715/821 |
| 2010/0088634 A1 | 4/2010 | Tsuruta et al. | |
| 2010/0214278 A1 | 8/2010 | Miura | |
| 2010/0248788 A1 | 9/2010 | Yook et al. | |
| 2010/0299597 A1* | 11/2010 | Shin | G06F 3/0482 715/702 |
| 2010/0306650 A1* | 12/2010 | Oh | G06F 3/0482 715/702 |
| 2010/0313156 A1 | 12/2010 | Louch et al. | |
| 2010/0313164 A1* | 12/2010 | Louch | G06F 3/0481 715/790 |
| 2011/0124376 A1* | 5/2011 | Kim | G06F 1/1626 455/566 |
| 2011/0163974 A1 | 7/2011 | Choi et al. | |
| 2011/0185283 A1* | 7/2011 | Jun | H04M 1/72572 715/745 |
| 2012/0066636 A1* | 3/2012 | Kaprani | G06F 3/0482 715/779 |
| 2012/0071208 A1* | 3/2012 | Lee | H04M 1/72544 455/566 |
| 2012/0110315 A1* | 5/2012 | Lee | G06F 9/45558 713/100 |
| 2012/0176322 A1 | 7/2012 | Karmi et al. | |
| 2012/0278756 A1* | 11/2012 | Shah | G06F 9/4443 715/790 |
| 2012/0303476 A1 | 11/2012 | Krzyzanowski et al. | |
| 2013/0050263 A1* | 2/2013 | Khoe | G06F 3/0481 345/634 |
| 2013/0227495 A1* | 8/2013 | Rydenhag | G06F 3/04886 715/863 |

FOREIGN PATENT DOCUMENTS

| | | |
|---|---|---|
| CN | 101352057 A | 1/2009 |
| CN | 102096550 A | 6/2011 |
| CN | 102215290 A | 10/2011 |
| CN | 102439861 A | 5/2012 |
| EP | 2 375 316 A2 | 10/2011 |
| EP | 2 375 316 A3 | 11/2015 |
| JP | 10-260784 A | 9/1998 |
| JP | 2004-046796 A | 2/2004 |
| JP | 2006-073015 A | 3/2006 |
| JP | 2006-115213 A | 4/2006 |
| JP | 2008-117181 A | 5/2008 |
| JP | 2008-134348 A | 6/2008 |
| KR | 10-0478920 B1 | 3/2005 |
| KR | 10-0650257 B1 | 11/2006 |
| KR | 10-0652626 B1 | 12/2006 |
| KR | 10-0700171 B1 | 3/2007 |
| KR | 10-2009-0016044 A | 2/2009 |
| KR | 10-2010-0053823 A | 5/2010 |
| KR | 10-2011-0080894 A | 7/2011 |
| WO | 2008/090902 A1 | 7/2008 |
| WO | 2009/017175 A1 | 2/2009 |
| WO | 2009/028892 A2 | 3/2009 |

\* cited by examiner

METHOD AND APPARATUS FOR CONVERTING AND DISPLAYING EXECUTION SCREENS OF A PLURALITY OF APPLICATIONS EXECUTED IN DEVICE

PRIORITY

This application claims the benefit under 35 U.S.C. § 119(a) of a Korean patent application filed on May 21, 2012 in the Korean Intellectual Property Office and assigned Serial No. 10-2012-0053777, the entire disclosure of which is hereby incorporated by reference.

BACKGROUND OF THE INVENTION

1. Field of the Invention

The present invention relates to a method and apparatus for converting and displaying a plurality of applications that are executed in a device. More particularly, the present invention relates to a method and apparatus for converting and displaying execution screens of a plurality of applications that are executed in a device.

2. Description of the Related Art

Multimedia data processing technology and communication technology have been recently advanced due to increased consumer demand, and recently, content providers have begun to provide reproduction of multimedia content, such as movies, music, or any other similar multimedia, as well as other various contents such as a Massive Multiplayer Online Role Playing Game (MMORPG) via a network, and a number of users, i.e. consumers, who use the multimedia data has increased.

With the availability of the multimedia content and the various other content, a user may use various applications related to services provided by the content providers, by using a variety of electronic devices, such as portable electronic devices, mobile terminals, personal computers, and other similar and/or suitable electronic devices. Furthermore, with respect to such electronic devices and communication technology, an increase in a data throughput, a processing speed, a data storage capacity, and other similar properties of an electronic device allows a user to simultaneously process more tasks, compared to the related art.

That is, the electronic device having an improved function may perform not only communication with respect to multimedia data, such as audio, video, and the like, between devices, but may also simultaneously perform a multimedia file editing task, a multimedia file reproducing task, a document editing task, an image capturing task, and a variety of other similar and/or suitable tasks, and the user may easily process the aforementioned tasks by using a plurality of applications. As described above, recent electronic devices execute a plurality of applications, thereby allowing a user to simultaneously perform a plurality of tasks.

SUMMARY OF THE INVENTION

Aspects of the present invention are to address at least the above-mentioned problems and/or disadvantages and to provide at least the advantages described below. Accordingly, an aspect of the present invention is to provide a method and apparatus for converting and displaying execution screens of a plurality of applications of a device in which the plurality of applications are executed.

According to an aspect of the present invention, a method of converting and displaying execution screens of a plurality of applications included in a device in which the plurality of applications are executed is provided. The method includes operations of displaying an execution screen of a first application from among the plurality of applications, receiving an external input corresponding to the first application, generating a list of the plurality of applications according to the external input; selecting a second application from among the plurality of applications by using the list, and displaying an execution screen of the second application.

According to another aspect of the present invention, an apparatus for converting and displaying execution screens of a plurality of applications included in a device in which the plurality of applications are executed is provided. The apparatus includes a displaying unit for displaying an execution screen of a first application from among the plurality of applications, a receiving unit for receiving an external input corresponding to the first application, a generating unit for generating a list of the plurality of applications according to the external input, and a selecting unit for selecting a second application from among the plurality of applications by using the list. The displaying unit may display an execution screen of the second application.

According to another aspect of the present invention, a computer-readable recording medium having recorded thereon a program for executing the method by using a computer is provided.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Throughout the drawings, it should be noted that like reference numbers are used to depict the same or similar elements, features, and structures.

DETAILED DESCRIPTION OF EXEMPLARY EMBODIMENTS

Figure 1A:
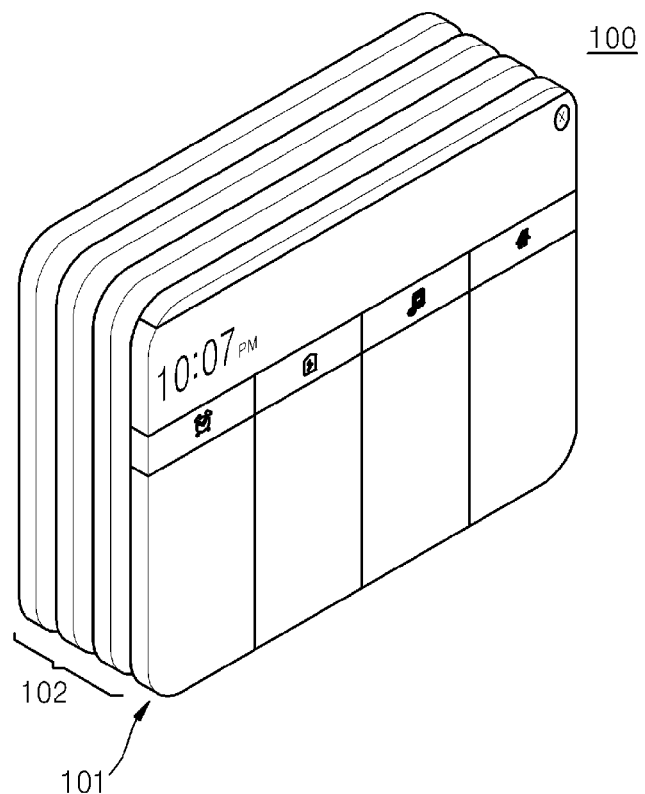
FIGS. 1A and 1B illustrate a currently-being-executed application and a plurality of applications in a pause state according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

It is to be understood that the singular forms "a," "an," and "the" include plural referents unless the context clearly dictates otherwise. Thus, for example, reference to "a component surface" includes reference to one or more of such surfaces.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

Hereinafter, the present invention will be described in detail by explaining exemplary embodiments of the invention with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. In the following description, well-known functions or constructions are not described in detail since they would obscure the invention with unnecessary detail, and throughout the specification, like reference numerals in the drawings denote like elements.

As used herein, expressions such as "at least one of," when preceding a list of elements, modify the entire list of elements and do not modify the individual elements of the list.

Figure 1B:
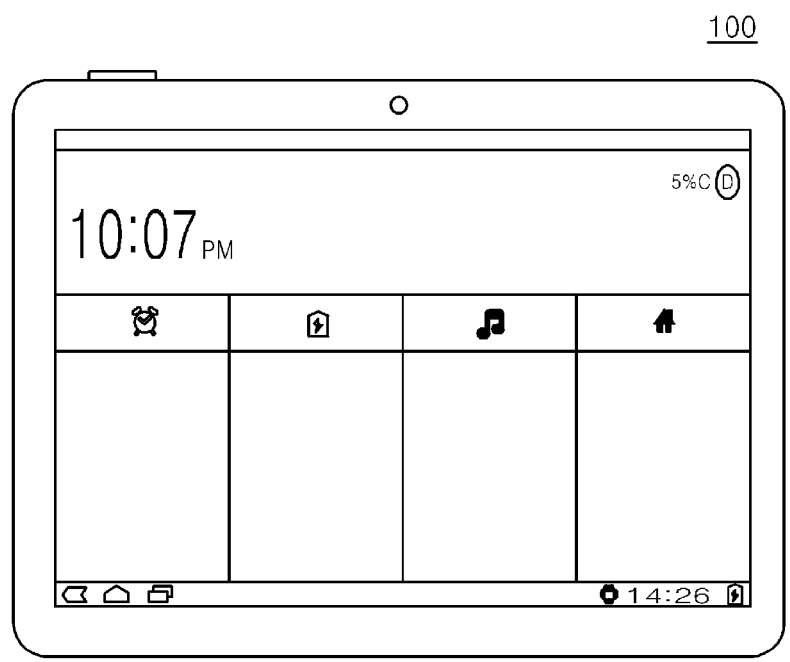

FIGS. 1A and 1B illustrates a currently-being-executed application and a plurality of applications in a pause state according to the related art.

Referring to FIGS. 1A and 1B, when a plurality of applications are executed on a device 100 in response to a user input, a plurality of pause-state applications 102 that were executed before a currently-being-executed application 101 remain in a standby state. In other words, according to the related art, the pause-state applications 102 remain in a pause state, i.e., the standby state, while the currently-being-executed application 101 is not in a pause state.

The pause-state applications 102 may be stopped while displaying a snap shot, or the like, of their own execution screens before they enter the pause state. In other words, when a user selects one of the pause-state applications 102, from among the pause-state applications 102, to be converted into a currently executed application, the device 100 changes a state of the currently-being-executed application 101 to a pause state and then executes the application to be converted into the currently-being-executed application 101, such that continuation of a task by the previously currently-being-executed application 101 is stopped.

Figure 2:
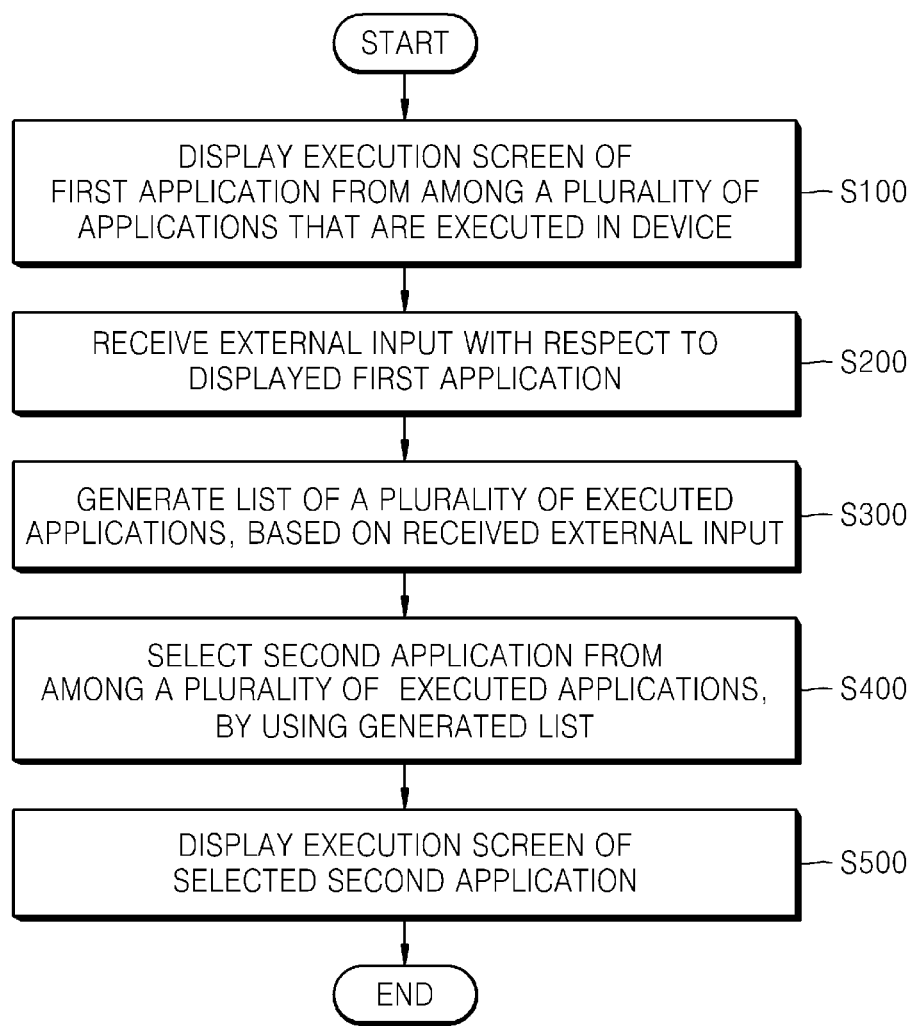
FIG. 2 is a flowchart illustrating conversion between a plurality of executed applications according to an exemplary embodiment of the present invention.

FIG. 2 is a flowchart illustrating conversion between a plurality of executed applications according to an exemplary embodiment of the present invention.

According to an exemplary embodiment, a method of converting and displaying execution screens of a plurality of applications of the device 200 in which the plurality of applications are executed involves displaying an execution screen of a first application 201 from among the plurality of executed applications in operation S100. Next, the device 200 receives an external input with respect to the displayed first application 201 in operation S200. The device 200 then generates a list of the plurality of executed applications in operation S300. Next, in operation S400, the device 200 selects a second application 205 that is one of the plurality of executed applications, by using the generated list, and then, in operation S500, displays an execution screen of the selected second application 205.

According to an exemplary embodiment, the device 200 may include a data storage unit such as a Central Processing Unit (CPU), a memory, and other suitable and/or similar elements included in electronic devices, portable electronic devices and mobile terminals, and may include a mobile phone, a Personal Digital Assistant (PDA), a smart-phone, a tablet computer, and other similar electronic devices, which are enabled for wired and wireless communication. According to an exemplary embodiment, the plurality of applications may be in an execution state in the device 200. In other words, all of the plurality of applications may be in a state such that they are being executed rather than being in a pause-state. For example, the plurality of applications may be simultaneously in state such that they are being executed. However, the present invention is not limited thereto, and the plurality of applications may be sequentially executed or may be executed at one time.

The first application 201 from among the plurality of applications may be focused and displayed via a display unit (not shown) of the device 200 which will be described later. For example, the focused first application 201 may indicate that the focused first application 201 is displayed using a full screen. According to an exemplary embodiment, an execution screen may include a screen of an application that is currently being executed by the device 200. The external input that is received in operation S200 with respect to the displayed first application 201 may include at least one of an input that is applied to the execution screen of the first application 201 for a predetermined period of time, an input that is applied to the execution screen of the first application 201 a predetermined number of times, and an input generated by movement of the device, or any other similar and/or suitable input that is inputted to the device 200.

In other words, the external input may include the input applied to the execution screen of the first application 201, which is focused and displayed, for the predetermined period of time. For example, the predetermined period of time may include a time equal to or greater than a pre-set reference time. For example, the pre-set reference time may include 1 second, 1.5 seconds, 2 seconds, 2.5 seconds, 3 seconds, and any other suitable amount of time.

The external input may also be the input that is applied to the execution screen of the first application 201 for the predetermined number of times. For example, the predetermined number of times may include a pre-set number of times. For example, the predetermined number of times may include an input such as a double click which is two clicks, taps, or similar input gestures that are sequentially input at least twice to the execution screen. Also, the predetermined number of times may include an input that is applied to a plurality of different points on the execution screen.

Also, the external input may include the input generated by the movement of the device 200. For example, the input generated by the movement of the device may be a movement such as shaking of the device 200. For example, when the device 200 is shaken for a predetermined period of time, the external input may be the input generated from movement of the device 200 which is detected by a sensor unit (not shown) such as a gyroscopic sensor, an accelerometer, and any other similar and/or suitable sensor for detecting occurrence of the movement.

When the external input is applied, a list 203 of the plurality of applications that are executed may be generated according to the external input in operation S300. The list 203 may include execution screens of the plurality of applications that are currently being executed. Furthermore, the list 203 may include images related to texts, icons, other similar graphical and non-graphical information, and the like which are related to the plurality of applications that are currently being executed. The list 203 may also include a table having a predetermined shape. The predetermined shape may include a polygonal shape, a round shape, and the like. For example, the list 203 may include a table formed of at least one row and at least one column. However, the present invention is not limited thereto, and the list 203 may be presented in any similar and/or suitable form that conveys information of the list 203 to a user of the device 200.

Figure 3:
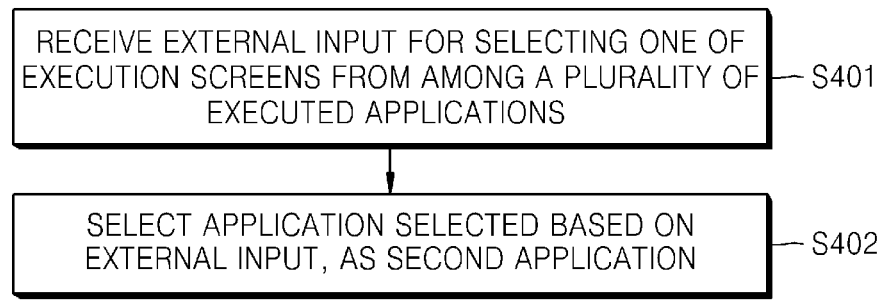
FIG. 3 is a flowchart illustrating a method of selecting an application to be converted by using a list according to an exemplary embodiment of the present invention.

FIG. 3 is a flowchart illustrating a method of selecting an application to be converted by using a list according to an exemplary embodiment of the present invention.

Referring to FIGS. 2 and 3, operation S400 of FIG. 2, which is for selecting the second application 205 from among the plurality of executed applications by using the list 203, may include operation S401, wherein the device 200 receives an external input for selecting one of execution screens from among the plurality of executed applications and may also include operation S402, wherein the device 200 selects an application, according to the external input, as the second application. The external input for the selecting one of the execution screens may be received by using at least one input device (not shown) including a touchscreen, a direction-key button, a joystick, a voice command, and any other similar and/or suitable external input applied to the device 200.

The second application 205 may be selected from the list 203 so as to correspond to the external input for the selecting one of the execution screens. A selected second application 205 may be highlighted while it is displayed in the list 203. For example, the selected second application 205 may be highlighted in a manner that the execution screen of the selected second application 205 has a boundary line larger than boundary lines of the execution screens of the plurality of executed applications in the list 203. Alternatively, the selected second application 205 may be highlighted in a manner that shading is inserted onto the execution screens of the plurality of executed applications other than the selected second application 205. According to an exemplary embodiment, operation S500 (see FIG. 2) for the displaying the execution screen of the second application 205 may include an operation of displaying the execution screen of the second application 205 that is a conversion target instead of displaying the execution screen of the first application 201.

Figure 4:
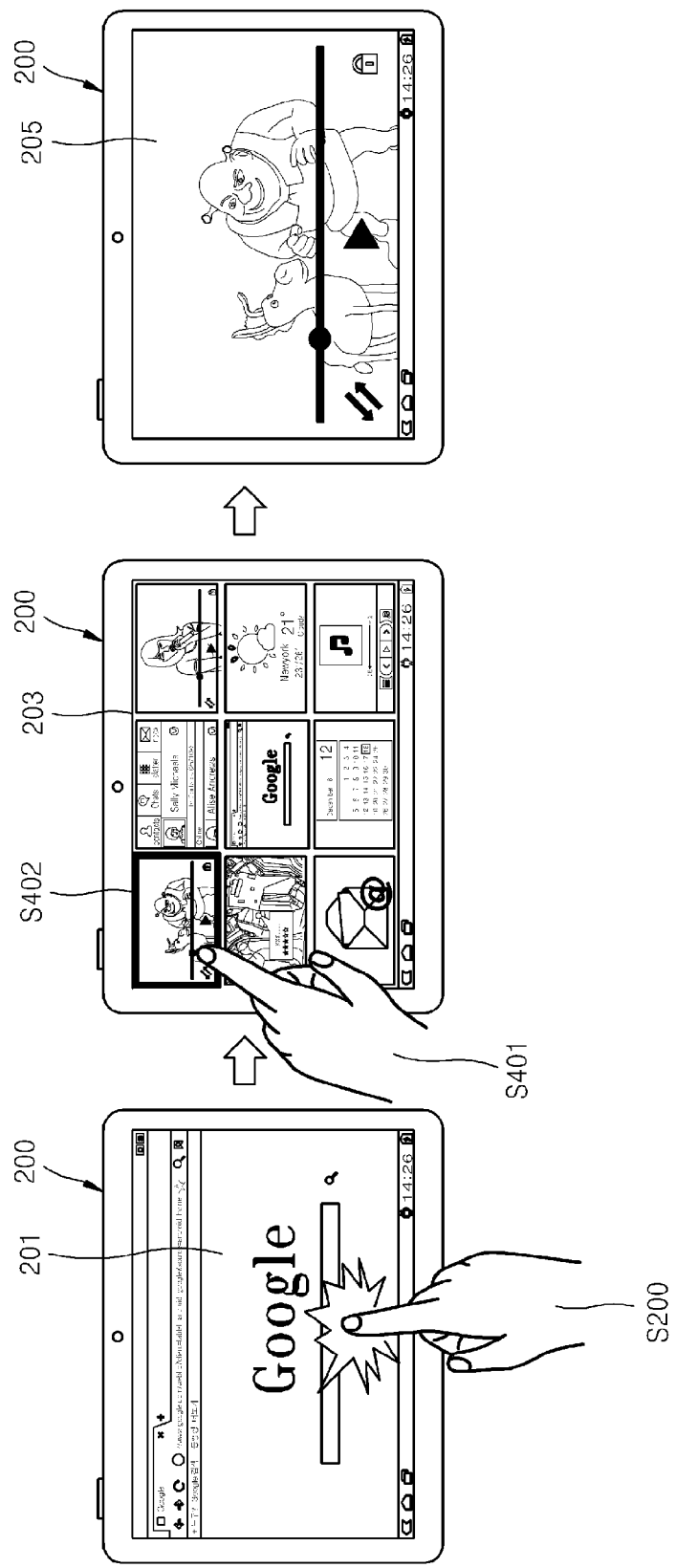
FIG. 4 illustrates an application conversion procedure according to an exemplary embodiment of the present invention.

FIG. 4 illustrates an application conversion procedure according to an exemplary embodiment of the present invention.

For example, when an execution screen of the first application 201 is displayed, an external input may be applied to the execution screen for a predetermined time as is shown with a user's hand executing operation S200 of FIG. 2. In response to the external input applied thereto, the list 203 may be generated with respect to a plurality of executed applications. The list 203 may include execution screens of the plurality of executed applications. Based on an external input to the list 203, as shown with the user's hand executing operation S401 of FIG. 3, one of the plurality of executed applications may be selected as is shown in operation S402 of FIG. 4. The selected application may be referred to as the second application 205. Then, an execution screen of the second application 205 may be displayed.

Figure 5:
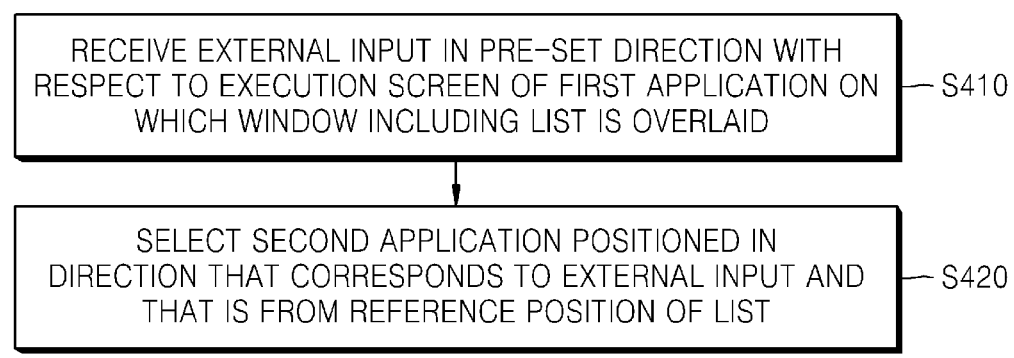
FIG. 5 is a flowchart illustrating a method of selecting an application to be converted by using a list according to another exemplary embodiment of the present invention.
Figure 6:
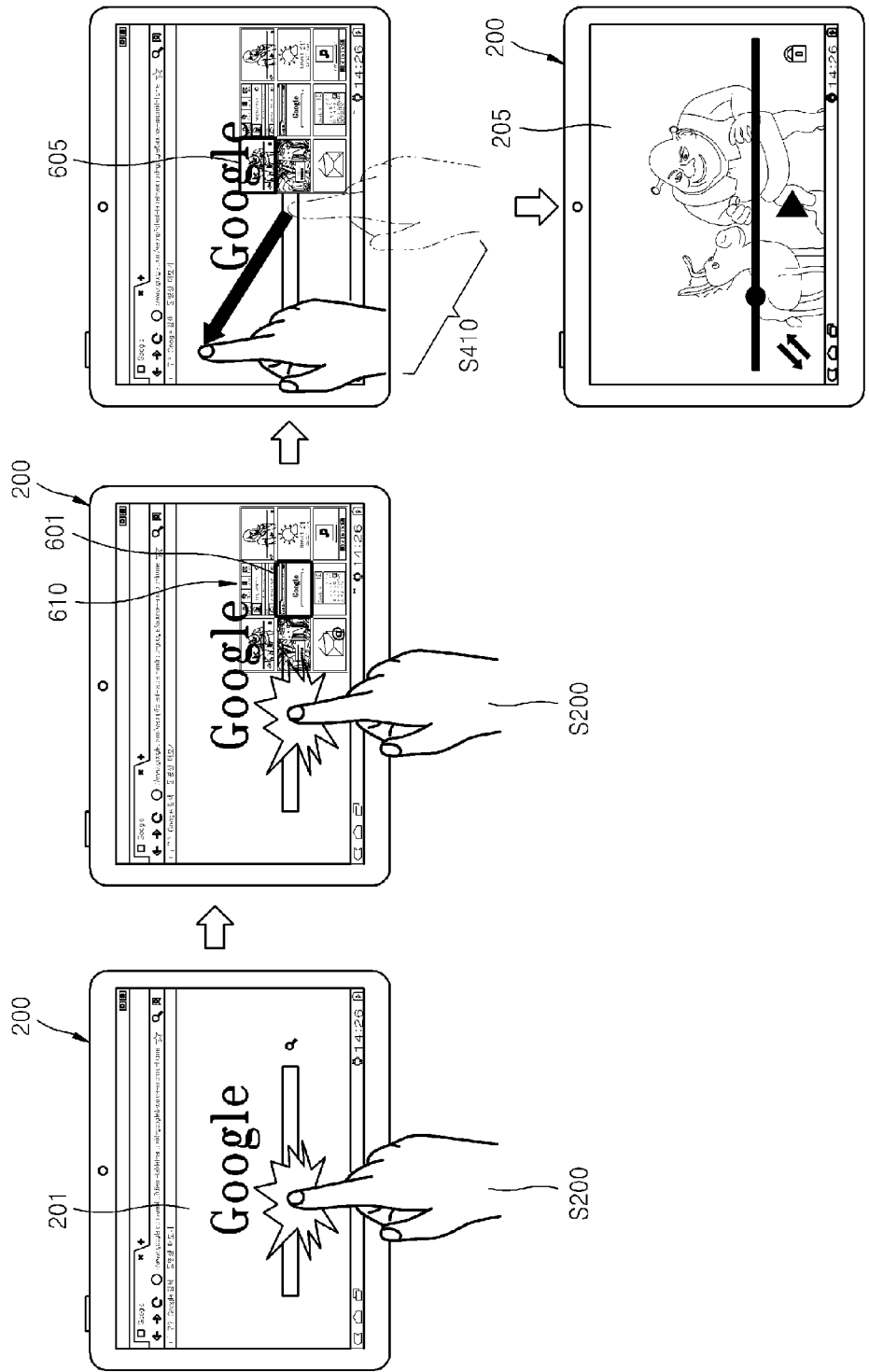
FIG. 6 illustrates an application conversion procedure according to another exemplary embodiment of the present invention.

FIG. 5 is a flowchart illustrating a method of selecting an application to be converted by using a list according to another exemplary embodiment of the present invention. FIG. 6 illustrates an application conversion procedure according to another exemplary embodiment of the present invention.

Referring to FIGS. 3, 5, and 6, and according to an exemplary embodiment, operation S300, for the generating the list of the plurality of executed applications, may include an operation of generating a window 610, the window 610 including the list, as shown in FIG. 6. According to the present exemplary embodiment, the window 610 may be overlaid on an execution screen of the first application 201 when the window 610 is displayed. Also, transparency of the window 610 may be adjusted. According to an exemplary embodiment, the window 610 may be displayed while it is overlaid as a pop-up window on the execution screen of the first application 201.

For example, when an input is applied to the execution screen of the first application 201 for a predetermined period of time, as shown in FIG. 6 with the user's hand executing operation S200, the window 610 including the list 203 may be generated. The window 610 may be displayed while being overlaid on the execution screen of the first application 201. For example, the predetermined period of time may include a time equal to or greater than a pre-set reference time period, and the pre-set reference time period may be any suitable amount of time, such as 1.5 seconds, 2 seconds, 3 seconds, and the like.

Operation S400 for the selecting the second application 205, which is one of the plurality of executed applications, by using the list 203 may include operation S410 (see FIG. 5) for receiving an external input in a pre-set direction with respect to the execution screen of the first application 201 on which the window 610 is overlaid and operation S420 of selecting the second application 205 positioned in a direction, which corresponds to the external input, from a reference position 601 of the list. Both of the operations S410 and S420 are illustrated in S420. The reference position 601 may be a pre-set position in the list 203, and the second application 205 may be included in the plurality of executed applications. However, the present invention is not limited thereto, and the reference position 601 may be any position in the window 610. The pre-set direction may be any suitable direction, for example, the pre-set direction may be up, down, left, right, and diagonal directions. The reference position 601 may include the pre-set position in the list 203, and the pre-set position may include a start position, an end position, a center position, or any other similar and/or suitable position of the list 203.

For example, as illustrated in FIG. 6, the list 203 provided as a table displayed in the window 610 may include the execution screen of the first application 201 at its center point, and the center point may be set as the reference position 601. In other words, a specific position such as the start position, the end position, or the center position of the list 203 may be set as the reference position 601, and then an application that is separated from the reference position 601 and that corresponds to an external input in the pre-set direction may be selected.

Referring to FIG. 6, when an external input in an upper-left diagonal direction is received, such as operation S410, then an execution screen 605 of the second application 205 in the list 203, which is disposed along the upper-left diagonal direction in the window 610 which has the first application 201 at the reference position 601 in the list 203, may be selected. According to an exemplary embodiment, the execution screen 605 of the second application 205 may be focused on and displayed.

With reference to FIGS. 2 and 6, operation S200 for the receiving the external input and operation S400 for the selecting the second application 205 may be performed in response to an external input signal that is constantly applied thereto. For example, the external input signal may include a signal generated by a touch-and-drag input with respect to the displayed execution screen of the first application 201. In further detail, the list 203 of the plurality of applications that are executed based on an input applied to the execution screen of the first application 201 for a predetermined period of time may be generated in operation S300 and may be displayed. When the second application 205 is selected by using the displayed list in operation S400, the input may have been constantly applied to the displayed execution screen of the first application 201.

In other words, the external input signal to the displayed execution screen of the first application 201 may be continually and constantly input. The input that is applied for a predetermined time may include at least one of a touch input and a drag input. The touch-and-drag input according to an exemplary embodiment may include an input in which at least one of the touch input and the drag input is continually and constantly input. However, the present invention is not limited thereto, and any suitable external input signal may be used in operation S400.

Figure 7:
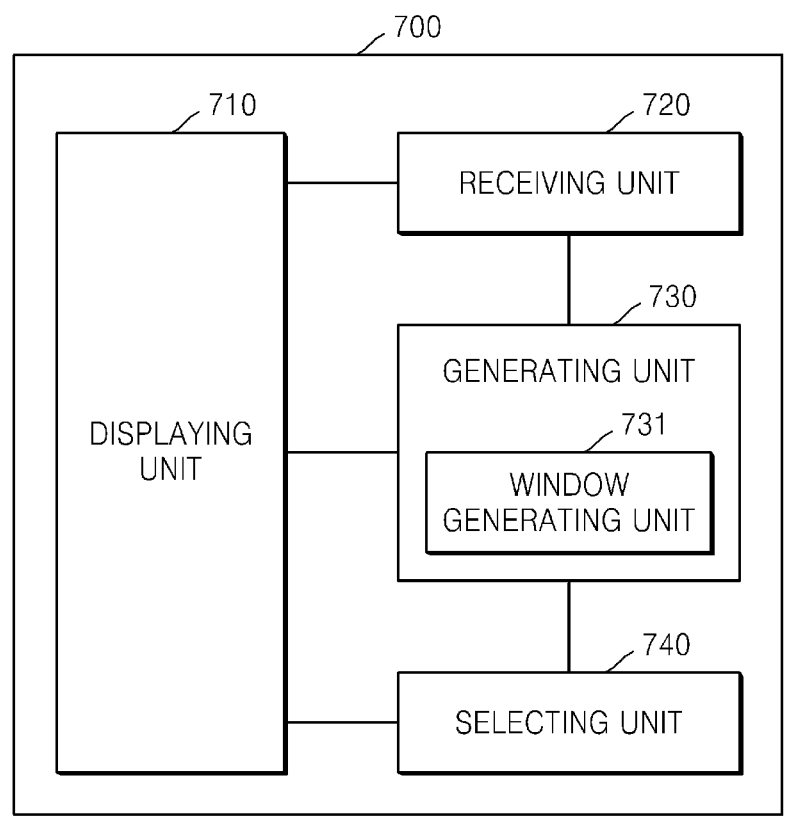
FIG. 7 is a diagram of an apparatus for conversion between a plurality of executed applications according to an exemplary embodiment of the present invention.

FIG. 7 is a diagram of an apparatus for conversion between a plurality of executed applications according to an exemplary embodiment of the present invention.

Referring to FIG. 7, an apparatus 700 for converting and displaying execution screens of a plurality of applications of a device in which the plurality of applications are executed may include a displaying unit 710 for displaying an execution screen of a first application from among the plurality of executed applications, a receiving unit 720 for receiving an external input with respect to the first application, a generating unit 730 for generating a list of the plurality of executed applications, based on the external input, and a selecting unit 740 for selecting a second application from among the plurality of executed applications by using the list.

Also, the displaying unit 710 may display an execution screen of the selected second application. The external input with respect to the first application may include at least one of an input applied to the execution screen of the first application for a predetermined period of time, an input applied to the execution screen of the first application a predetermined number of times, an input generated by movement of the device, or any other similar and/or suitable external input. The list may include the execution screens of the plurality of executed applications.

The receiving unit 720 may receive an external input for selecting one of the execution screens of the plurality of executed applications. The receiving unit 720 may select an application, which is selected based on the received external input, as the second application. The generating unit 730 may further include a window generating unit 731 for generating a window, such as the window 610 shown in FIG. 6, including the list, and the window 610 may be displayed while being overlaid on the execution screen of the first application. Also, transparency of the window 610 may be adjusted.

The receiving unit 720 may receive an external input in a pre-set direction with respect to the execution screen of the first application on which the window 610 is overlaid. The selecting unit 740 may select the second application positioned along a direction which corresponds to the external input from the reference position 601 (see FIG. 6) of the list. The reference position 601 may include a pre-set position in the list. The second application may be included in the plurality of executed applications. The pre-set direction may include at least one of up, down, left, right, and diagonal directions.

The receiving unit 720 and the selecting unit 740 may operate in response to an external input signal that is constantly applied thereto. For example, the external input signal may include a signal generated by a touch-and-drag input executed on the displaying unit 710. In response to the external input signal, the list of the plurality of applications that are executed based on an input applied to the displaying unit 710 for a predetermined period of time may be generated and displayed. When the input has been constantly applied to the displaying unit 710 for the predetermined period of time, the second application may be selected by the selecting unit 740 using the displayed list. In other words, the external input signal that is input to the displaying unit 710 may be continually and constantly input. The external input signal applied for a predetermined time may include at least one of a touch input and a drag input. The touch-and-drag input according to an exemplary embodiment may include an input in which at least one of the touch input and the drag input is continually and constantly input. The features related to the aforementioned method may be applied to the apparatus 700. Thus, descriptions about the apparatus 700, which are similar to the aforementioned descriptions about the method, are omitted here.

The exemplary embodiments of the present invention may be written as computer programs and may be implemented in general-use digital computers that execute the programs using a non-transitory computer readable recording medium. Examples of the non-transitory computer readable recording medium include magnetic storage media (e.g., Read Only Memory (ROM), floppy disks, hard disks, etc.), optical recording media (e.g., Compact Disc (CD)-ROMs, or Digital Versatile Discs (DVDs)), or any other similar and/or suitable non-transient storage medium that stores information that may be read and/or processed by a computer.

While this invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of converting and displaying execution screens of a plurality of applications included in a device in which the plurality of applications are running, the method comprising:
displaying an execution screen of a first application from among the plurality of applications on a display of the device;
receiving a first external input being generated by a touch input on the execution screen of the first application;
generating a list of the plurality of applications according to the first external input, the list including the execution screen of the first application and the execution screens of the plurality of applications, a position of the execution screen of the first application in the list being set as a reference position;
displaying a window overlaid on a predetermined region of the execution screen of the first application on the display of the device, the window displaying the list;
receiving a second external input being generated by a touch-and-drag input on the execution screen in a pre-set direction from the reference position;
determining a second application included among the plurality of applications, based on the second external input, the second application being separate from the reference position, the second application being highlighted in the list; and
displaying an execution screen of the second application on the display of the device.

2. The method of claim 1, wherein the first external input comprises at least one of an input applied to the execution screen of the first application for a predetermined period of time, an input applied to the execution screen of the first application a predetermined number of times, and an input generated by movement of the device.

3. The method of claim 1, wherein the list comprises images related to the plurality of applications.

4. The method of claim 3,
wherein the generating of the list further comprises generating the window displaying the list, and
wherein the window is displayed while being overlaid on the execution screen of the first application.

5. The method of claim 4, wherein a transparency of the window is adjusted.

6. The method of claim 1, wherein the pre-set direction comprises at least one of up, down, left, right, and diagonal directions.

7. The method of claim 1,
wherein the receiving of the first external input and the second external input and the selecting of the second application are performed in response to an external input signal that is constantly applied to the device, and
wherein the external input signal comprises a signal generated by a touch-and-drag input executed on the display of the device.

8. An apparatus for converting and displaying execution screens of a plurality of applications included in a device in which the plurality of applications are running, the apparatus comprising:
a display;
a processor; and
a memory comprising instructions that, when executed by the processor, perform operations comprising:
displaying an execution screen of a first application from among the plurality of applications on a display of the device,
receiving a first external input being generated by a touch input on the execution screen of the first application,
generating a list of the plurality of applications according to the first external input, the list including the execution screen of the first application and the execution screens of the plurality of applications, a position of the execution screen of the first application in the list being set as a reference position,
displaying a window overlaid on a predetermined region of the execution screen of the first application on the display of the device, the window displaying the list,
receiving a second external input being generated by a touch-and-drag input on the execution screen in a pre-set direction from the reference position,
determining a second application included among the plurality of applications, based on the second external input, the second application being separate from the reference position, the second application being highlighted in the list, and
displaying an execution screen of the second application on the display of the device.

9. The apparatus of claim 8, wherein the first external input comprises at least one of an input applied to the execution screen of the first application for a predetermined period of time, an input applied to the execution screen of the first application a predetermined number of times, and an input generated by movement of the device.

10. The apparatus of claim 8, wherein the list comprises images related to the plurality of applications.

11. The apparatus of claim 10,
wherein the processor is further configured to generate a window displaying the list, and
wherein the window is displayed while being overlaid on the execution screen of the first application.

12. The apparatus of claim 11, wherein a transparency of the window is adjusted.

13. The apparatus of claim 8, wherein the pre-set direction comprises at least one of up, down, left, right, and diagonal directions.

14. The apparatus of claim 8,
wherein the processor is further configured to operate in response to an external input signal that is constantly applied thereto, and
wherein the external input signal comprises a signal generated by a touch-and-drag input executed on the display.

15. A non-transitory computer-readable recording medium having recorded thereon a program for executing the method of claim 1.

16. The method of claim 1, further comprising displaying a highlighted window including the execution screen of the second application,
wherein the execution screen of the second application is highlighted in the list, and
wherein the highlighted window is overlaid on the predetermined region of the execution screen of the first application on the display of the device.

* * * * *